United States Patent
Rodrigues et al.

(10) Patent No.: US 6,498,974 B1
(45) Date of Patent: Dec. 24, 2002

(54) METHOD FOR CONTROLLING A TRANSFER CASE WHICH UTILIZES A PROPORTIONAL AND AN INTEGRAL CONTROL COMPONENT

(75) Inventors: Ashok Rodrigues, Farmington Hills; John Glab, Riverview, both of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 235 days.

(21) Appl. No.: 09/607,085

(22) Filed: Jun. 28, 2000

(51) Int. Cl.[7] .............................................. B60K 17/344
(52) U.S. Cl. .......................... 701/69; 701/69; 701/89; 701/90; 701/71; 701/88; 180/249; 477/35; 477/71
(58) Field of Search ............................. 701/69, 70, 74, 701/89; 180/197, 233, 248, 247; 303/147; 475/36, 213

(56) References Cited

U.S. PATENT DOCUMENTS

| | | | | |
|---|---|---|---|---|
| 4,989,686 A | * | 2/1991 | Miller et al. ................. | 180/197 |
| 5,809,443 A | * | 9/1998 | Perttunen et al. ............. | 701/69 |
| 5,954,778 A | * | 9/1999 | Rodrigues et al. ............ | 701/69 |
| 6,105,702 A | * | 8/2000 | Showalter .................... | 180/247 |
| 6,132,332 A | * | 10/2000 | Yasui ........................... | 477/36 |
| 6,263,995 B1 | * | 7/2001 | Watson et al. .............. | 180/248 |

* cited by examiner

Primary Examiner—William A. Cuchlinski, Jr.
Assistant Examiner—Tuan C To
(74) Attorney, Agent, or Firm—Ford Global Technologies, Inc.

(57) ABSTRACT

A transfer case control system or apparatus 10 is provided for use on a four-wheel drive vehicle of the type having a transfer case 32, a front driveshaft 22 and a rear driveshaft 26. Transfer case control system 10 includes a conventional microcontroller or controller 40 having a memory unit 42 and operating under stored program control. Controller 40 is communicatively coupled to sensors 44, 46, 48, and to a transfer case 32. Controller 40 selectively generates a control signal having a proportional term or component and an integral term or component. The control signal is generated to transfer case 32 and controls the amount of torque provided to driveshafts 22, 26.

12 Claims, 2 Drawing Sheets

METHOD FOR CONTROLLING A TRANSFER CASE WHICH UTILIZES A PROPORTIONAL AND AN INTEGRAL CONTROL COMPONENT

FIELD OF THE INVENTION

This invention relates to a method for controlling a transfer case and more particularly, to a method for controlling a transfer case within a four wheel drive vehicle which provides a relatively quick and smooth torque adjustment response by utilizing both a proportional and an integral control component.

BACKGROUND OF THE INVENTION

Four-wheel drive vehicles typically include a transfer case which selectively transfers torque and power from the vehicle's input shaft to a front and a rear driveshaft, thereby selectively rotating the front and rear driveshafts. The transfer case includes a conventional electromagnetic clutch assembly which typically and selectively transfers torque from a primary driveshaft (e.g., the rear driveshaft) to a secondary driveshaft (e.g., the front driveshaft), thereby reducing the torque provided to the primary driveshaft and increasing the torque provided to the secondary driveshaft. The clutch assembly is typically and communicatively coupled to a controller and/or control system which determines the amount of torque that is to be provided to the rear and front driveshafts (e.g., primary and secondary driveshafts), based upon vehicle sensory data, and which generates a control or command signal to the clutch assembly, thereby controlling the amount of torque which is provided to front and rear driveshafts.

In order to provide torque and traction to the front and rear wheels of the vehicle and to substantially avoid relative slip between the front and rear wheels, the transfer case control system typically monitors and adjusts the speed of both the front and rear driveshafts. For example and without limitation, when the speed of the front driveshaft or front wheels differs from the speed of the rear driveshaft or rear wheels by and an amount or "error", these prior systems alter or change the value of the control or command signal to provide more or less torque to the front and/or to the rear driveshaft in order to substantially prevent and/or reduce the likelihood of relative slip between the front and rear wheels. Particularly, these prior systems typically alter the magnitude of the control signal based upon the difference between the speed of the front and rear driveshafts (e.g., the "delta shaft speed"), and typically "step up" or "step down" the magnitude of the control signal based on whether the delta shaft speed exceeds a slip table value.

While these types of prior systems relatively quickly respond to and correct relative slip conditions between the front and rear wheels in many situations, they suffer from some drawbacks. One drawback associated with these prior systems is that the "delta shaft speed" value may vary significantly over relatively short periods of time, thereby causing the value of the command signal to vary significantly over the same period of time. This variance of the command signal often results in a "rough" or "choppy" ride and in undesirable noise and vibration harshness ("NVH") problems, which are experienced by the operator and/or passengers of the vehicle.

Furthermore, these prior strategies that "step" the clutch response by a fixed amount do not account for the degree and duration of slip. Particularly, these strategies can lead to a slow response in cases of sudden, dramatic slip (such as wheels on ice), as the controller must gradually build up a clutch response. The constant rate can also lead to an objectionable rhythmic pulsation when the vehicle is on a consistently slippery surface (e.g., sand), as the system constantly slips, ramps up the clutch, resolves slip, ramps down the clutch, then slips again and repeats the process at a consistent rate.

There is therefore a need for a method and an apparatus for controlling a transfer case within a four-wheel drive vehicle which provides a relatively quick and smooth torque adjustment response by utilizing both a proportional and an integral control component.

SUMMARY OF THE INVENTION

It is a first object of the invention to provide a method and an apparatus for controlling a transfer case within a four wheel drive vehicle which overcomes at least some of the previously delineated drawbacks of the prior systems, devices, and/or methods.

It is a second object of the invention to provide a method and an apparatus for controlling a transfer case within a four-wheel drive vehicle which monitors relative slip between the front and rear wheels of the vehicle and which provides a relatively smooth and quick torque adjustment response to and correction of relative slip situations.

It is a third object of the invention to provide a method and an apparatus for controlling a transfer case within a four-wheel drive vehicle which includes a proportional control component and an integral control component and which is effective to substantially prevent slip between the front and rear wheels of the vehicle in a manner which does not cause undesirable NVH.

According to one aspect of the present invention a system for controlling a transfer case is provided. The transfer case is operatively disposed within a four-wheel drive vehicle of the type having a front driveshaft which rotates at a first speed during a first interval of time and at a second speed during a second interval of time, and a rear driveshaft which rotates at a third speed during the first interval of time and at a fourth speed during the second interval of time. The transfer case is adapted to selectively provide torque to the front and the rear driveshaft. The system includes a first sensor which measures the first speed and generates a first signal which represents the first speed, and which measures the second speed and generates a second signal which represents the second speed; a second sensor which measures the third speed and generates a third signal which represents the third speed, and which measures the fourth speed and generates a fourth signal which represents the fourth speed; and a controller which is communicatively coupled to the transfer case and to the first sensor and the second sensor. The controller receives the first, second, third and fourth signals, utilizes the first signal and the third signal to calculate a first error value, and utilizes the second signal and the fourth signal to calculate a second error value. The controller is further adapted to selectively generate an output signal which is derived based upon the first error value and the second error value, the output signal being effective to selectively control said torque which is transferred to the front and the rear driveshaft.

According to a second aspect of the present invention, a method for controlling a transfer case which is operatively disposed within a four wheel drive vehicle of the type having a front driveshaft rotating at a first speed and a rear driveshaft rotating at a second speed, is provided. The transfer case is adapted to selectively provide torque to the front driveshaft and the rear driveshaft. The method includes the steps of: calculating an error value based upon a difference between the second speed and the first speed; calculating a proportional value which is proportional to the error value; calculating an integral value which is based upon the error value and a previously calculated integral value; generating an output signal, the output signal having a value equal to the proportional value plus the integral value; and selectively transmitting the output signal to the transfer case, effective to control the amount of torque provided to the front and the rear driveshaft.

Further objects, features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
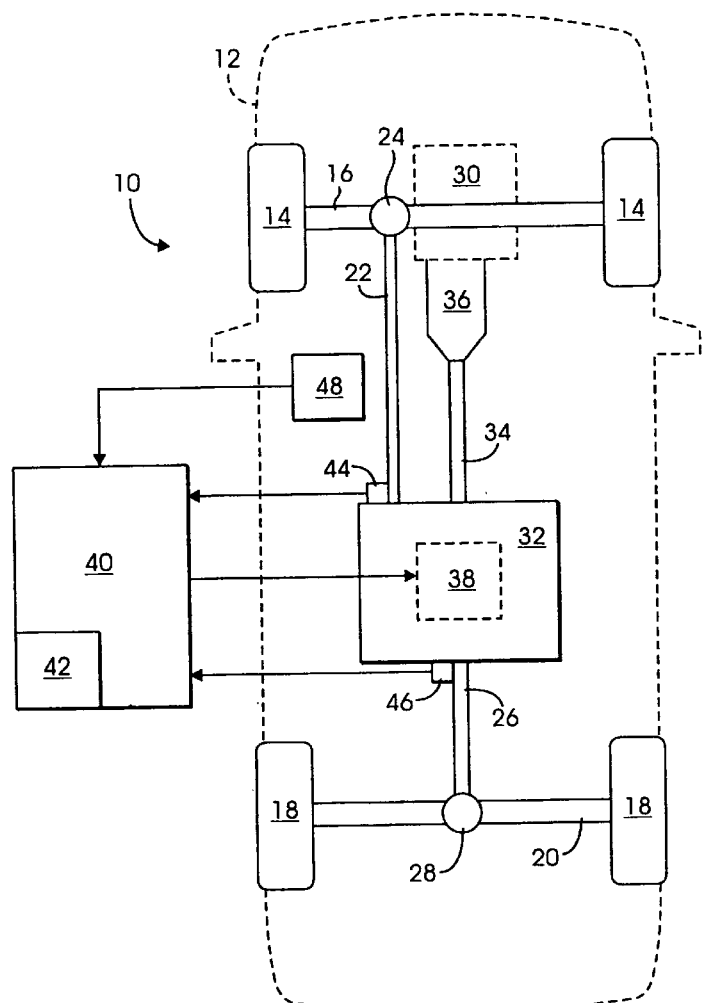
FIG. 1 is a schematic diagram of a four-wheel drive vehicle including a control system which incorporates the teachings of the preferred embodiment of the invention and which is employed on a vehicle.

Referring now to FIG. 1, there is shown a transfer case control system or apparatus 10 made in accordance with the teachings of the preferred embodiment of the invention. As shown, system 10 is deployed upon a four-wheel drive vehicle 12 having a pair of front wheels 14 which are operatively mounted upon a front axle 16, and a pair of rear wheels 18 which are operatively mounted upon a rear axle 20. Front axle 16 is operatively coupled to and receives torque and power from a front driveshaft 22 through a front differential assembly 24, and rear axle 20 is operatively coupled to and receives torque and power from a rear driveshaft 26 through a rear differential assembly 28.

Front and rear driveshafts 22, 26 selectively receive torque and power from the vehicle engine 30 through the transfer case 32. Particularly, torque and/or power generated by the engine 30 is delivered to transfer case 32 through an input shaft 34 which is coupled to the transmission system or assembly 36. Rear driveshaft 26 is coupled to the transmission assembly 36 and continuously receives torque from the input shaft 34. Transfer case 32 includes a conventional electromagnetic clutch assembly 38 which selectively transfers torque to the front driveshaft 22, thereby reducing the torque supplied to the rear driveshaft 26. In the preferred embodiment of the invention, clutch assembly 38 is a conventional "on-demand" type clutch assembly. It should be appreciated that the terms "front" and "rear" are used herein for convenience purposes only (e.g., to respectively refer to a secondary and primary driveshaft), and in alternate embodiments of the invention, the front and rear driveshafts may be interchanged (e.g., the front driveshaft may act as the primary driveshaft).

Transfer case control system 10 includes a conventional microcontroller or controller 40 having a memory unit 42 and operating under stored program control. Controller 40 is electrically, physically, and communicatively coupled to sensors 44, 46, 48, and to clutch assembly 38. Controller 40 receives signals generated by sensors 44–48, processes and utilizes the received signals to determine the amount of torque which is to be respectively provided to front and rear driveshafts 22, 26, and based upon this determination, generates a command signal to selectively activate the clutch assembly 38, thereby selectively distributing torque to the front driveshaft 22 from the rear driveshaft 26.

In the preferred embodiment, controller 40 is a conventional powertrain controller including one or more microprocessors and subprocessors which cooperatively perform the below-described calculations, subroutines and/or processes. In the preferred embodiment, controller 40 generates a pulse-width-modulated ("PWM") signal which controls the amount of slippage between plates of the clutch assembly 38, thereby controlling the amount of torque and power which is transferred to front driveshaft 22 from the rear driveshaft 26. Particularly, the duty cycle of the PWM signal (i.e., the amount or percentage of the cycle time for which the signal is activated or "enabled") controls the amount of torque which is being transferred to the respective driveshafts 22, 26. The output signal of the controller 40, which is communicated to the clutch assembly 38, is interchangeably referred to herein as a "duty cycle" output and/or as "torque" output signal.

In the preferred embodiment of the invention, memory 42 is a conventional memory unit including both permanent and temporary memory, and is adapted to and does store at least a portion of the operating software which directs the operation of controller 40. Moreover, memory 42 is adapted to selectively store other types of data or information, including information associated with the operation of the preferred embodiment of the invention and/or associated historical data, processing data, and/or operational data. As will be more fully discussed below, examples of such data include, but are not limited to, data relating to the speed of driveshafts 22, 26, the difference in the speed of driveshafts 22, 26, referred to as the "delta shaft speed", and other engine operating data, which are used by controller 40 to determine the amount of torque that should be provided to driveshafts 22, 26. Memory 42 also stores various mathematical constant and threshold values which are selectively utilized to calculate a control output signal, and present and past control signal output values and other potential output values. These values are preferably held within one or more matrixes or database tables which are stored within memory 42. As should also be apparent to those of ordinary skill in the art, controller 40 and memory 42 may actually comprise several commercially available, conventional, and disparate chips or devices, which are operatively and communicatively linked in a cooperative manner.

Sensors 44 and 46 comprise conventional and commercially available sensors which respectively measure the rotational speed of the front driveshaft 22 and the rear driveshaft 26, and which respectively generate and communicate signals representing each of these measured speeds to controller 40. Sensors 48 comprise conventional and commercially available vehicle operating condition sensors, and may include one or more conventional engine or vehicle speed and/or acceleration sensors, and one or more "fault" detection sensors, which detect faults or abnormalities in the operation of engine 30 or in the operation of the other components of vehicle 12.

Sensors 44–48 provide data representing the above-delineated measured values to controller 40, which utilizes these values, in a known and conventional manner, to generate a PWM signal to transfer case 32 and/or clutch assembly 38, thereby selectively controlling the power and torque which is provided to driveshafts 22 and 26. It should be appreciated that sensors 44–48 may include filtering and/or processing devices or circuits (e.g., low pass, high pass, and/or band pass filters) which filter and/or process the measured or sensed data prior to sending the data to controller 40.

Figure 2:
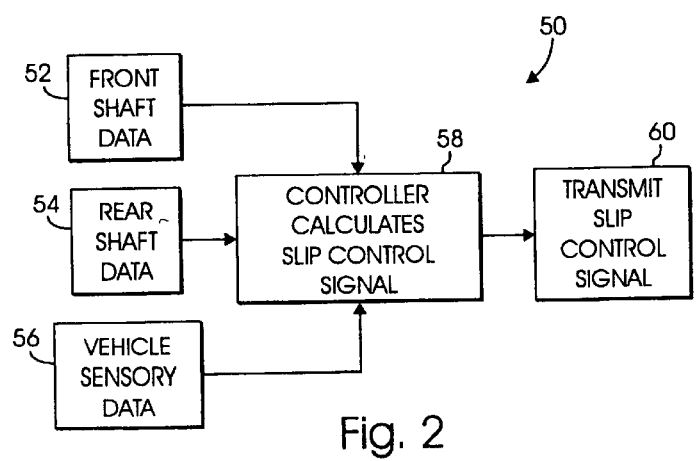
FIG. 2 is a block diagram illustrating the broad functionality of the control system shown in FIG. 1.

To understand the general operation of system 10, reference is now made to flow chart 50 of FIG. 2, illustrating the broad functionality of system 10. As shown, data 52 represents the speed of the front driveshaft 22 which is derived in a known manner from the measurements taken by sensor 44. Controller 40 processes drive shaft speed data received from sensor 44 and uses conventional algorithms and/or equations to determine and/or estimate the speed of the vehicle's front wheels 14. Data 54 represents the speed of the rear driveshaft 26, which is derived in a known manner from the measurements taken by sensor 46 (i.e., in a manner substantially identical to that described with respect to data 52) and is used to determine the speed of the vehicle's rear wheels 18. Data 56 represents other vehicle operating data which is measured and/or processed by sensors 48.

As illustrated in block 58, the controller 40 receives and utilizes the data 52–56 to calculate and/or create a slip control signal. As described more fully and completely below, the slip control signal which is transmitted is the larger of a proportional and integral ("PI") signal value and a "front boost" signal. The PI signal y(k) is calculated by use of the following equation:

$$y(k) = Y_i(k) + Y_p(k) \quad \text{(Eq. 1)}$$

where k represents the current iteration of the calculation, $Y_i(k)$ is the "integral" term or component, and $Y_p(k)$ is the "proportional" term or component. The integral term is derived by use of the following equation:

$$Y_i(k) = Y_i(k-1) + [T*K_i]*e(k) \quad \text{(Eq. 2)}$$

where T represents the time interval between iterations of the calculation, $K_i$ is equal to an integral gain constant, and e(k) is equal to the delta shaft speed (i.e., the difference between the speed of the rear driveshaft 26 and the speed of the front driveshaft 22) minus an "allowable slip" factor. The proportional term is calculated by use of the following equation:

$$Y_p(k) = K_p*e(k) \quad \text{(Eq. 3)}$$

where Kp is equal to a proportional gain constant. Controller 40 selectively determines the "front boost" signal value by use of a matrix or index table stored within memory 42. As shown in functional block or step 60, controller 40 transmits the slip control signal (i.e., the larger of the PI signal or the "front boost" signal) to the transfer case 32, thereby selectively controlling the amount of torque which is supplied to the front driveshaft 22 and the rear driveshaft 26.

Figure 3:
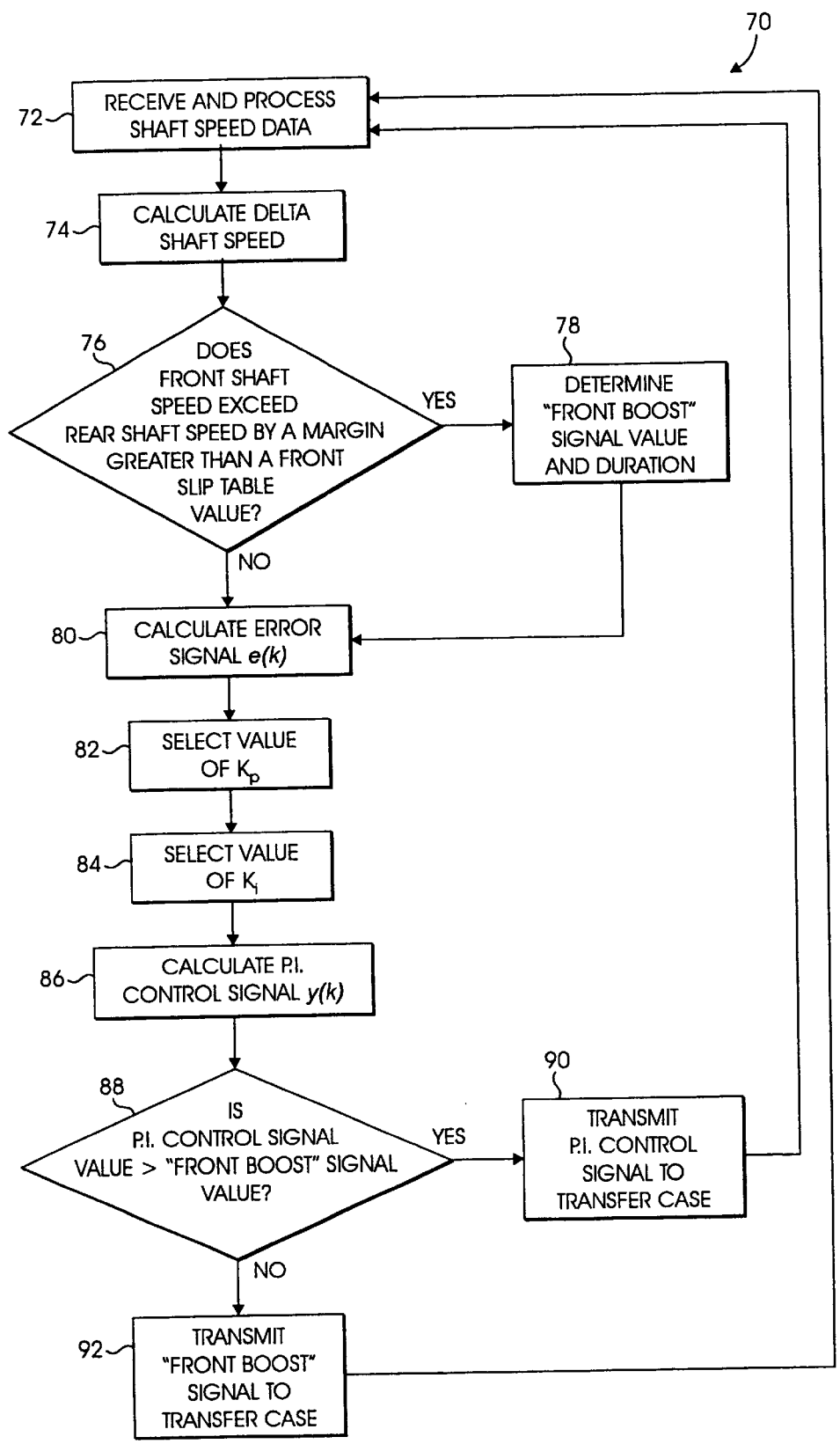
FIG. 3 is a block diagram illustrating the detailed operational functionality of the control system shown in FIG. 1.

To more fully understand the operational functionality of the preferred embodiment of system 10, reference is now made to the operational flow diagram or "flow chart" 70 of FIG. 3. As shown in functional block or step 72, controller 40 receives and processes the shaft speed data 52, 54 and determines the speeds of the front driveshaft 22 and/or wheels 14 and the rear driveshaft 26 and/or wheels 18. Controller 40 next calculates the "delta shaft speed" by subtracting the speed of the front driveshaft 22 ("front shaft speed") from the speed of the rear driveshaft 26 ("rear shaft speed"), as illustrated in functional block or step 74.

In functional block or step 76, the controller determines whether the front shaft speed exceeds the rear shaft speed by an amount or margin greater than a predetermined value which is stored within a "slip table" or matrix held within memory 42. The table or matrix includes a plurality of "slip margin" values (e.g., speed values) which each correspond to a particular front shaft speed value or range of values, and which each represent an amount of relative slip which is considered "allowable" at a particular speed or range of speeds. The current front shaft speed is used to "index" or "reference" the matrix or database table, thereby providing a corresponding "slip margin" or speed value. If the front shaft speed exceeds the rear shaft speed by an amount greater than the indexed or referenced slip margin, controller 40 sets the "front boost" signal or duty cycle value equal to zero and proceeds to functional block or step 80.

Alternatively, controller 40 determines the "front boost" signal or duty cycle value and a "front boost" signal duration value, as illustrated in functional block or step 78. The "front boost" signal value and duration is determined or selected by use of a matrix or database table substantially similar to the matrix or database table previously described in step 76. Particularly, the matrix includes a plurality of "front boost" signal values (e.g., duty cycle percentage values) and duration values (e.g., time periods) which correspond to a particular front shaft speed value or range of values. In one non-limiting embodiment, the "front boost" signal is equal to a single predetermined value. Once a "front boost" signal value and a duration value have been selected, controller 40 proceeds to functional block or step 80.

In step 80, controller 40 calculates the error signal e(k) by subtracting an "allowable" slip factor or margin from the delta shaft speed. In this calculation, the "allowable" slip factor or margin is selected by way of a rear slip table or matrix which includes a plurality of "allowable slip" values (e.g., speed values) which each correspond to a particular rear shaft speed value or range of values, and which each represent an amount of relative slip which is considered to be "allowable" at a particular speed or range of speeds. The current rear shaft speed is used to "index" or "reference" the matrix or database table, thereby providing a corresponding "allowable slip" value. In one non-limiting embodiment, system 10 is adapted to sense, in a known manner, whether a "spare tire" is being used on vehicle 12 or if the wheels 14, 18 have differing effective diameters. If such a condition is sensed, controller 40 increases the "allowable slip" value by an offset factor or value, thereby compensating for the differing effective diameters of wheels 14, 18.

Once the error signal e(k) is calculated, controller 40 proceeds to functional block or step 82, and selects a value for the proportional gain constant $K_p$. In the preferred embodiment of the invention, $K_p$ is set or made equal to a "down" gain value "$K_p\_DN$" if e(k) is less than zero, which indicates that the torque provided to the front driveshaft 22 should be reduced, and is set or made equal to a "up" gain value "$K_p\_UP$" if e(k) is greater than zero, which indicates the torque provided to front driveshaft 22 should be increased. By selectively using two separate proportional gain constant values $K_p\_UP$ and $K_p\_DN$, system 10 is able to substantially reduce NVH problems without compromising response time of the system.

In functional block or step 84, controller 40 elects or determines a value for the integral gain constant $K_i$. The integral gain constant $K_i$ is determined by calculating the vehicle's speed, by use of the slower of the front or rear shaft speed value, and by calculating the integral term $Y_i(k)$ by use of Equation 2 and substituting the previously selected $K_i$ value into the equation. The integral term $Y_i(k)$ is then compared to an integrator threshold value $Y_i\_Switch$, and the vehicle speed is compared to a speed threshold value $V\_K_i\_Switch$. The value of Ki is then determined and/or selected as follows:

$K_i=K_i\_UP\_H$ when $e(k)>0$ and $Y_i(k)>Y_i\_Switch$;

$K_i=K_i\_UP\_L$ when $e(k)>0$ and $Y_i(k)\leq Y_i\_Switch$;

$K_i=K_i\_DN\_Fast\_H$ when $e(k)<0$ and $Y_i(k)>Y_i\_Switch$ and vehicle speed $\leq V\_K_i\_Switch$;

$K_i=K_i\_DN\_Fast\_L$ when $e(k)<0$ and $Y_i(k)\leq Y_i\_Switch$ and vehicle speed $\leq V\_K_i\_Switch$; and $K_i=K_i\_DN\_Slow$ when $e(k)<0$ and vehicle speed$>V\_K_i\_Switch$.

In the preferred embodiment of the invention, the values of $Y_i\_Switch$, $V\_K_i\_Switch$, $K_i\_UP\_H$, $K_i\_UP\_L$, $K_i\_DN\_Fast\_H$, $K_i\_DN\_Fast\_L$, and $K_i\_DN\_Slow$ are each calibratable and are established through data that is acquired from testing the type of vehicle and/or transfer case which is being controlled. It should be appreciated that by utilizing the vehicle's speed when determining the value of $K_i$, system 10 considers or accounts for the fact that the vehicle's speed is a parameter of system binding, thereby minimizing the amount of binding within system 10.

Once the values of constant terms $K_i$ and $K_p$ have been selected, the PI control signal $y(k)$ value is calculated by use of Equation 1, as illustrated in functional block or step 86. In the preferred embodiment of the invention, controller 40 "limits" or controls the respective contributions of the integral term or component $Y_i(k)$ and the proportional term or component $Y_p(k)$. Specifically, the integral term $Y_i(k)$ is limited to a range of values between a maximum value $Y_i\_max$ and a minimum value $Y_i\_min$ (e.g., if $Y_i(k)$ exceeds $Y_i\_max$, $Y_i(k)$ is set equal to $Y_i\_max$, and if $Y_i(k)$ is less than $Y_i\_min$, $Y_i(k)$ is set equal to $Y_i\_min$), and the proportional term $Y_p(k)$ is limited to a range of values between a maximum value $Y_p\_max$ and a minimum value $Y_p\_min$ (e.g., if $Y_p(k)$ exceeds $Y_p\_max$, $Y_p(k)$ is set equal to $Y_p\_max$, and if $Y_p(k)$ is less than $Y_p\_min$, $Y_p(k)$ is set equal to $Y\_min$). In one non-limiting embodiment, the calculated PI control signal value $Y(k)$ is additionally limited to a range of values between a maximum value $Y\_max$ and a minimum value $Y\_min$.

In functional block or step 88, controller 40 compares the PI control signal value to the "front boost" signal value. If the PI control signal value is greater than the "front boost" signal value, controller 40 transmits the PI control signal to the transfer case 32, as illustrated in functional block or step 90. Otherwise, the controller 40 transmits the "front boost" signal to the transfer case 32. The controller 40 then returns to functional block or step 72 and repeats the above-described procedure.

It should be appreciated that the foregoing system provides significant advantages over prior systems. For example and without limitation, the front boost strategy of the present system minimizes clutch torque during a "front overrun" situation, thereby adequately controlling engine braking while minimizing the steering effect of a blown or low tire. Alternate approaches react to slip in a generally equal fashion, whether the slip is caused by the rear wheels spinning due to excess power or skidding due engine braking. While a high amount of clutch activation (e.g., duty cycle) may be needed to control spin due to excess power, engine braking requires relatively little clutch torque to control. The "front boost" strategy of the present invention bypasses the normal PI control to supply only a limited, fixed amount of clutch in cases where the rear wheels move slower than the front (by the amount in the front slip table or more). This is an important benefit in the case of a blown or very low pressure front tire, as clutch torque can exert an undesired steering effect, and the lower clutch torque provided by the present invention minimizes this effect.

Furthermore, the use of the $Y_i\_max$ value and the other limiting values, prevent certain values from dominating the PI equations. Traditional PI systems and/or equations allow $Y_i$ and $Y_p$ terms to increase and decrease without boundaries. However, as certain severe circumstances could allow the clutch to slip for substantial periods of time before the slip is resolved, the possibility exists for the $Y_i$ term to become unreasonably high, requiring an extended period of non-slip before it is restored to a low level. During this period the vehicle would undesirably bind in turns if driven on dry pavement. The limit $Y_i\_max$ prevents this domination and allows a quick return to the desired control state. Moreover, the minimum limit on $Y_p$ or $Y_p\_min$ provides similar benefits. Setting the $Y_p$ to zero requires the $Y_i$ portion of the equation to "bleed off" the clutch by itself when slip is resolved, as there is no negative $Y_p$ term in the $Y=Y_i+Y_p$ equation to assist it. This prevents, if necessary, the $Y_p$ portion of the equation from suddenly dominating the $Y_i$ term and "turning off" the clutch after slip is resolved, which might cause the system to frequently pulse as it resolves slip then quickly pulls away control.

The "gain switching" strategy of the present invention optimizes the response to certain vehicle conditions. Traditional PI equations use fixed gains for $K_i$ and $K_p$. The present system, however, allows switching of the $K_i$ and $K_p$ gains based on parameters both internal to the equation and from external inputs, thereby customizing the response to the specific system being controlled and the immediate conditions. For example, the different $K_i\_UP$ and $K_i\_DN$ gains allows the system to turn the clutch on quickly to control slip rapidly, yet bleed it off more slowly to prevent a sudden re-occurrence of slip and the pulsations that might accompany it. Similarly, the switching based on the current $Y_i$ value allows the present system to quickly move through regions of clutch duty cycle values that are known to have undesirable effects. For example, the system might be adjusted to quickly transition through the 20–30% range of clutch duty cycles if the clutch system tends to cause vibration if held too long in that range.

It should be further appreciated that in alternate embodiments, the above-described functional steps may be performed in a different order or procedure, and may include other additional control and/or slip prevention subroutines and/or procedures which are used in conjunction with the functional steps described herein. For example and without limitation, in alternate embodiments, controller 40 "considers" or "factors in" throttle position when determining duty cycle values. Switching based upon throttle position allows the system to reduce the clutch more quickly .in cases where a driver is likely to go into a turn and notice "bind-up" if the vehicle is on dry pavement.

It is understood that the various inventions are not limited to the exact construction illustrated and described above, but that these previously delineated inventions may be varied without departing from the scope of the inventions as described in the following claims.

What is claimed is:

1. A system for controlling a transfer case which is operatively disposed within a four-wheel drive vehicle of the type having a front driveshaft which rotates at a first speed during a first interval of time and at a second speed during a second interval of time, and a rear driveshaft which rotates at a third speed during said first interval of time and at a fourth speed during said second interval of time, said transfer case being adapted to selectively provide torque to said front and said rear driveshaft, said system comprising:

- a first sensor which measures said first speed and generates a first signal which represents said first speed, and which measures said second speed and generates a second signal which represents said second speed;
- a second sensor which measures said third speed and generates a third signal which represents said third speed, and which measures said fourth speed and generates a fourth signal which represents said fourth speed; and
- a controller which is communicatively coupled to said transfer case and to said first sensor and to said second sensor, which receives said first, second, third and fourth signals, which utilizes said first signal and said third signal to calculate a first error value, and which utilizes said second signal and said fourth signal to calculate a second error value, said controller being further adapted to selectively generate an output signal which is derived based upon said first error value and said second error value, said output signal being effective to selectively control said torque which is transferred to said front and said rear driveshaft;
- wherein said first interval of time occurs after said second interval of time and wherein said first error value is equal to said third speed minus said first speed and a first allowable slip value and said second error value is equal to said fourth speed minus said second speed and a second allowable slip value.

2. The system of claim 1 wherein said controller multiplies said first error value by a proportional gain constant when deriving said output signal.

3. The system of claim 2 wherein said controller is further adapted to set said proportional gain constant to a first constant value when said first error value is greater than zero and to a second constant value when said first error value is less than zero.

4. The system of claim 1 wherein said controller multiplies said first error value by an integral gain constant when deriving said output signal.

5. The system of claim 4 wherein said controller is further adapted to set said integral gain constant to a third constant value when said first error value is greater than zero and to a fourth constant value when said first error value is less than zero.

6. The apparatus of claim 1 wherein said controller is further adapted to limit said output signal to a first predetermined range of values.

7. A system for controlling a transfer case which is operatively disposed within a four-wheel drive vehicle of the type having a front driveshaft which rotates at a first speed during a first interval of time and at a second speed during a second interval of time, and a rear driveshaft which rotates at a third speed during said first interval of time and at a fourth speed during said second interval of time, said transfer case being adapted to selectively provide torque to said front and said rear driveshaft, said system comprising:

- a first sensor which measures said first speed and generates a first signal which represents said first speed, and which measures said second speed and generates a second signal which represents said second speed;
- a second sensor which measures said third speed and generates a third signal which represents said third speed, and which measures said fourth speed and generates a fourth signal which represents said fourth speed; and
- a controller which is communicatively coupled to said transfer case and to said first sensor and to said second sensor, which receives said first, second, third and fourth signals, which utilizes said first signal and said third signal to calculate a first error value, and which utilizes said second signal and said fourth signal to calculate a second error value, said controller being further adapted to selectively generate an output signal which is derived based upon said first error value and said second error value, said output signal being effective to selectively control said torque which is transferred to said front and said rear driveshaft;
- wherein said controller is further effective to compare said output signal to a front boost signal and to use the larger of said output signal and said front boost signal to selectively control said torque.

8. A method for controlling a transfer case which is operatively disposed within a four wheel drive vehicle of the type having a front driveshaft rotating at a first speed and a rear driveshaft rotating at a second speed, said transfer case being adapted to selectively provide torque to said front driveshaft and said rear driveshaft, said method comprising the steps of:

- calculating an error value based upon a difference between said second speed and said first speed minus a slip table value;
- calculating a proportional value which is proportional to said error value by multiplying said error value by a proportional gain constant;
- calculating an integral value which is based upon said error value and a previously calculated integral value;
- generating an output signal, said output signal having a value equal to said proportional value plus said integral value; and
- selectively transmitting said output signal to said transfer case, effective to control the amount of torque provided to said front and said rear driveshaft;
- wherein said proportional gain constant is equal to a first proportional gain constant value when said error value is less than zero and is equal to a second proportional gain constant value when said error value is greater than zero.

9. The method of claim 8 wherein said integral value is calculated by use of a integral gain constant.

10. The method of claim 9 wherein said integral gain constant is set equal to a value which is based upon the slower of said first and said second speed, and the error signal value.

11. The method of claim 8 further comprising the steps of:
- determining if said second speed exceeds said first speed by an allowable front slip value;
- calculating a front boost signal if said second speed exceeds said first speed by said allowable front slip value;
- determining whether said front boost signal has a value which is greater than said value of said output signal; and
- transmitting only the larger of said output signal value and said front boost signal value to said transfer case.

12. The method of claim 9 wherein said front boost signal value is determined based upon said first speed.

* * * * *